US008328637B2

(12) United States Patent
Langridge et al.

(10) Patent No.: US 8,328,637 B2
(45) Date of Patent: Dec. 11, 2012

(54) COMBAT ACTION SELECTION USING SITUATIONAL AWARENESS

(75) Inventors: Adam J. Langridge, Godalming (GB); Peter D. Molyneux, London (GB); Guy Simmons, Fleet (GB)

(73) Assignee: Microsoft Corporation, Redmond, WA (US)

(*) Notice: Subject to any disclaimer, the term of this patent is extended or adjusted under 35 U.S.C. 154(b) by 904 days.

(21) Appl. No.: 11/820,968

(22) Filed: Jun. 21, 2007

(65) Prior Publication Data
US 2008/0318654 A1 Dec. 25, 2008

(51) Int. Cl.
*A63F 13/00* (2006.01)
(52) U.S. Cl. .......... 463/29; 463/8; 463/31; 463/36
(58) Field of Classification Search ........ 463/8, 29, 463/31, 36
See application file for complete search history.

(56) References Cited

U.S. PATENT DOCUMENTS

| | | | | |
|---|---|---|---|---|
| 6,162,120 A * | 12/2000 | Takahashi et al. | | 463/8 |
| 6,179,713 B1 * | 1/2001 | James et al. | | 463/42 |
| 6,340,330 B1 * | 1/2002 | Oishi et al. | | 463/8 |
| 6,354,940 B1 * | 3/2002 | Itou et al. | | 463/8 |
| 6,361,438 B1 * | 3/2002 | Morihira | | 463/31 |
| 6,371,850 B1 * | 4/2002 | Sonoda | | 463/8 |
| 6,695,694 B2 | 2/2004 | Ishikawa | | 463/7 |
| 6,746,332 B1 | 6/2004 | Ing | | 463/42 |
| 6,763,325 B1 | 7/2004 | Stone | | 703/8 |
| 7,001,272 B2 | 2/2006 | Yamashita | | 463/7 |
| 7,085,722 B2 | 8/2006 | Luisi | | 704/275 |
| 7,137,891 B2 | 11/2006 | Neveu | | 463/31 |
| 2001/0004609 A1 * | 6/2001 | Walker et al. | | 463/42 |
| 2001/0008398 A1 | 7/2001 | Komata | | 345/156 |
| 2002/0010734 A1 | 1/2002 | Ebersole | | 709/201 |
| 2005/0037826 A1 | 2/2005 | Rupert | | 463/4 |
| 2006/0084509 A1 * | 4/2006 | Novak et al. | | 463/49 |
| 2006/0252538 A1 | 11/2006 | Olsen | | 463/36 |

FOREIGN PATENT DOCUMENTS

| | | |
|---|---|---|
| KR | 10-2002-0009119 A | 2/2002 |
| KR | 10-2005-0095310 A | 9/2005 |
| KR | 10-2005-0114772 A | 12/2005 |
| WO | WO 2006/112087 A1 | 10/2006 |

OTHER PUBLICATIONS

International Search Report and Written Opinion of PCT/US2008/0066532 filed Jun. 11, 2008.
Update on the Soar/Games Project http://www.eecs.umich.edu/~soar/sitemaker/workshop/19/vanlent-SWS-Games.pdf.
Dreamfall: The Longest Journey review http://www.adventuregamers.com/article/id,626/p,2.
Tom Clancy's Ghost Recon: Advanced Warfighter (Ubisoft) http://www.ugo.com/channels/games/features/ghostrecon3/review.asp.
Games and Applications http://www.nvidia.com/page/go_7300_games.html.

(Continued)

*Primary Examiner* — Pierre Eddy Elisca
*Assistant Examiner* — Shahid Kamal
(74) *Attorney, Agent, or Firm* — Westman, Champlin & Kelly, P.A.

(57) ABSTRACT

A game environment is disclosed where actions are automatically selected based on a situational awareness for a player in the game environments. The situational awareness can be determined based on conditions of the player, objects and other characters in the game environment.

19 Claims, 9 Drawing Sheets

OTHER PUBLICATIONS

Notice of Rejection dated Apr. 22, 2011 in related Chinese Serial No. 200880021260.X, filed Jun. 11, 2008. 7 pgs. English Translation Summary Attached.

Second Official Action dated Mar. 26, 2012 in related Chinese application Serial No. 200880021260.X, filed Jun. 11, 2008, 10 pgs including English translation.

* cited by examiner

COMBAT ACTION SELECTION USING SITUATIONAL AWARENESS

BACKGROUND

In several video games, a player is represented as a character and traverses through a virtual environment. Within the virtual environment, the player can encounter several different situations. In a combat situation, the player engages one or more opponents with the objective of damaging and/or destroying the opponents. The player can damage and/or destroy opponents through various combat actions. Control of these combat actions can result in a narrow and boring action, which can detract from the gaming experience for the user. For example, these actions may be a simple punch or kick to the opponent. In current video games, to perform more complicated actions, the user provides several inputs from a game controller to perform actions that are more exciting. However, the several inputs can be difficult to learn and can be unintuitive such that the more complicated actions are underutilized by players within the video games.

The discussion above is merely provided for general background information and is not intended to be used as an aid in determining the scope of the claimed subject matter.

SUMMARY

A game environment is disclosed where actions are automatically selected based on a situational awareness for a player in the game environment. The situational awareness can be determined based on conditions of the player, objects and other characters in the game environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
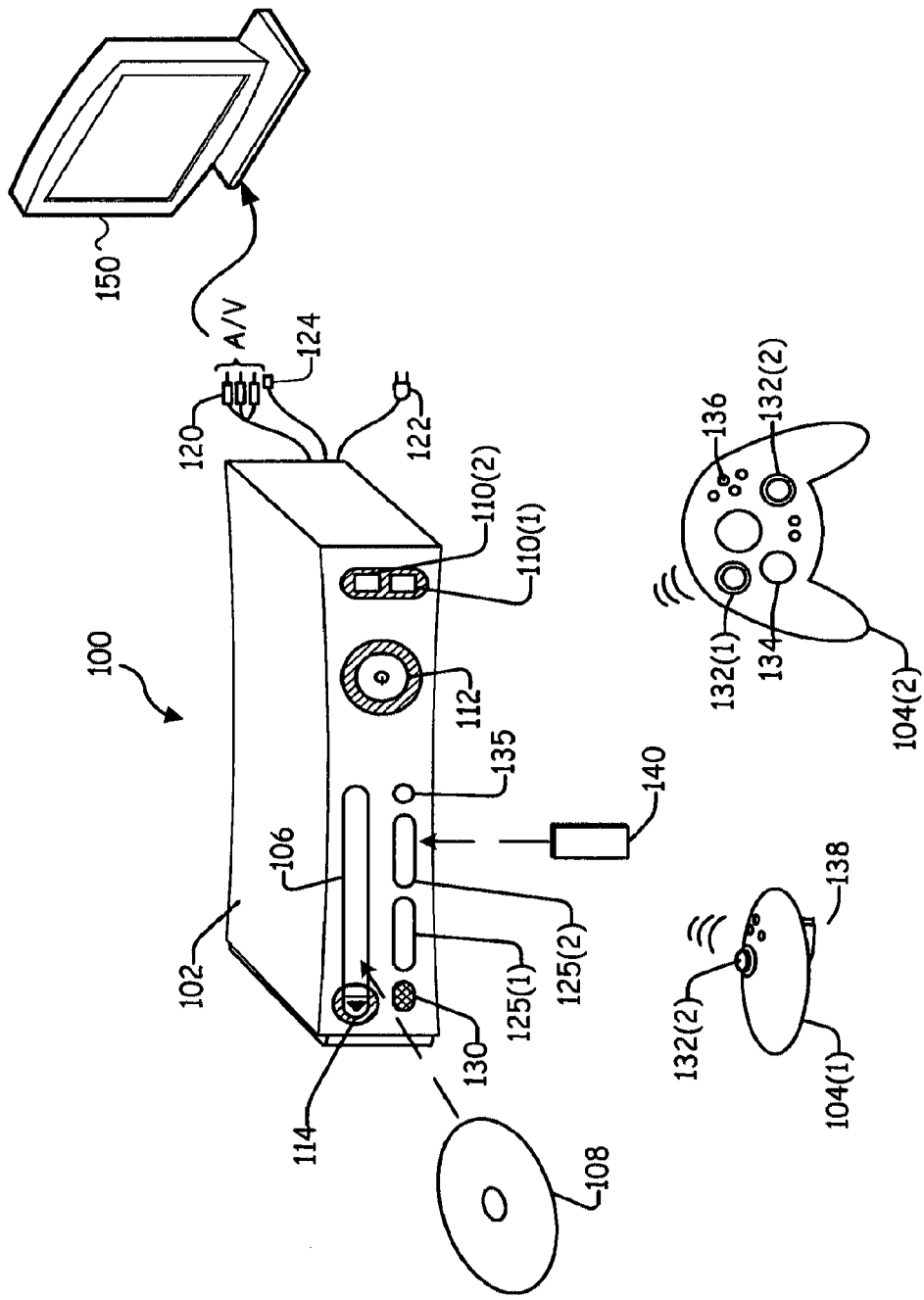
FIG. 1 is an isometric view of an exemplary view gaming and media system.

FIG. 1 shows an exemplary gaming and media system 100. The following discussion of FIG. 1 is intended to provide a brief, general description of a suitable environment in which concepts presented herein may be implemented. As shown in FIG. 1, gaming and media system 100 includes a game and media console (hereinafter "console") 102. In general, console 102 is one type of computing system, as will be further described below. Console 102 is configured to accommodate one or more wireless controllers, as represented by controllers 104(1) and 104(2). Console 102 is equipped with an internal hard disk drive (not shown) and a portable media drive 106 that supports various forms of portable storage media, as represented by optical storage disc 108. Examples of suitable portable storage media include DVD, CD-ROM, game discs, and so forth. Console 102 also includes two memory unit card receptacles 125(1) and 125(2), for receiving removable flash-type memory units 140. A command button 135 on console 102 enables and disables wireless peripheral support.

As depicted in FIG. 1, console 102 also includes an optical port 130 for communicating wirelessly with one or more devices and two USB (Universal Serial Bus) ports 110(1) and 110(2) to support a wired connection for additional controllers, or other peripherals. In some implementations, the number and arrangement of additional ports may be modified. A power button 112 and an eject button 114 are also positioned on the front face of game console 102. Power button 112 is selected to apply power to the game console, and can also provide access to other features and controls, and eject button 114 alternately opens and closes the tray of a portable media drive 106 to enable insertion and extraction of a storage disc 108.

Console 102 connects to a television or other display 150 via A/V interfacing cables 120. In one implementation, console 102 is equipped with a dedicated A/V port (not shown) configured for content-secured digital communication using A/V cables 120 (e.g., A/V cables suitable for coupling to a High Definition Multimedia Interface "HDMI" port on a high definition monitor or other display device). A power cable 122 provides power to the game console. Console 102 may be further configured with broadband capabilities, as represented by a cable or modem connector 124 to facilitate access to a network, such as the Internet. The broadband capabilities can also be provided wirelessly, through a broadband network such as a wireless fidelity (Wi-Fi) network.

Each controller 104 is coupled to console 102 via a wired or wireless interface. In the illustrated implementation, the controllers are USB-compatible and are coupled to console 102 via a wireless or USB port 110. Console 102 may be equipped with any of a wide variety of user interaction mechanisms. In an example illustrated in FIG. 1, each controller 104 is equipped with two thumbsticks 132(1) and 132(2), a D-pad 134, buttons 136, and two triggers 138. These controllers are merely representative, and other known gaming controllers may be substituted for, or added to, those shown in FIG. 1.

In one implementation (not shown), a memory unit (MU) 140 may also be inserted into console 100 to provide additional and portable storage. Portable MUs enable users to store game parameters for use when playing on other consoles. In this implementation, each controller is configured to accommodate two MUs 140, although more or less than two MUs may also be employed.

Gaming and media system 100 is generally configured for playing games stored on a memory medium, as well as for downloading and playing games, and reproducing pre-recorded music and videos, from both electronic and hard media sources. With the different storage offerings, titles can be played from the hard disk drive, from optical disk media (e.g., 108), from an online source, or from MU 140. A sample of the types of media that gaming and media system 100 is capable of playing include:

Game titles played from CD and DVD discs, from the hard disk drive, or from an online source.

Digital music played from a CD in portable media drive 106, from a file on the hard disk drive (e.g., music in the Windows Media Audio (WMA) format), or from online streaming sources.

Digital audio/video played from a DVD disc in portable media drive 106, from a file on the hard disk drive (e.g., Active Streaming Format), or from online streaming sources.

During operation, console 102 is configured to receive input from controllers 104 and display information on display 150. For example, console 102 can display a user interface on display 150 to allow a user to operate and interact with an interactive game title.

Figure 2:
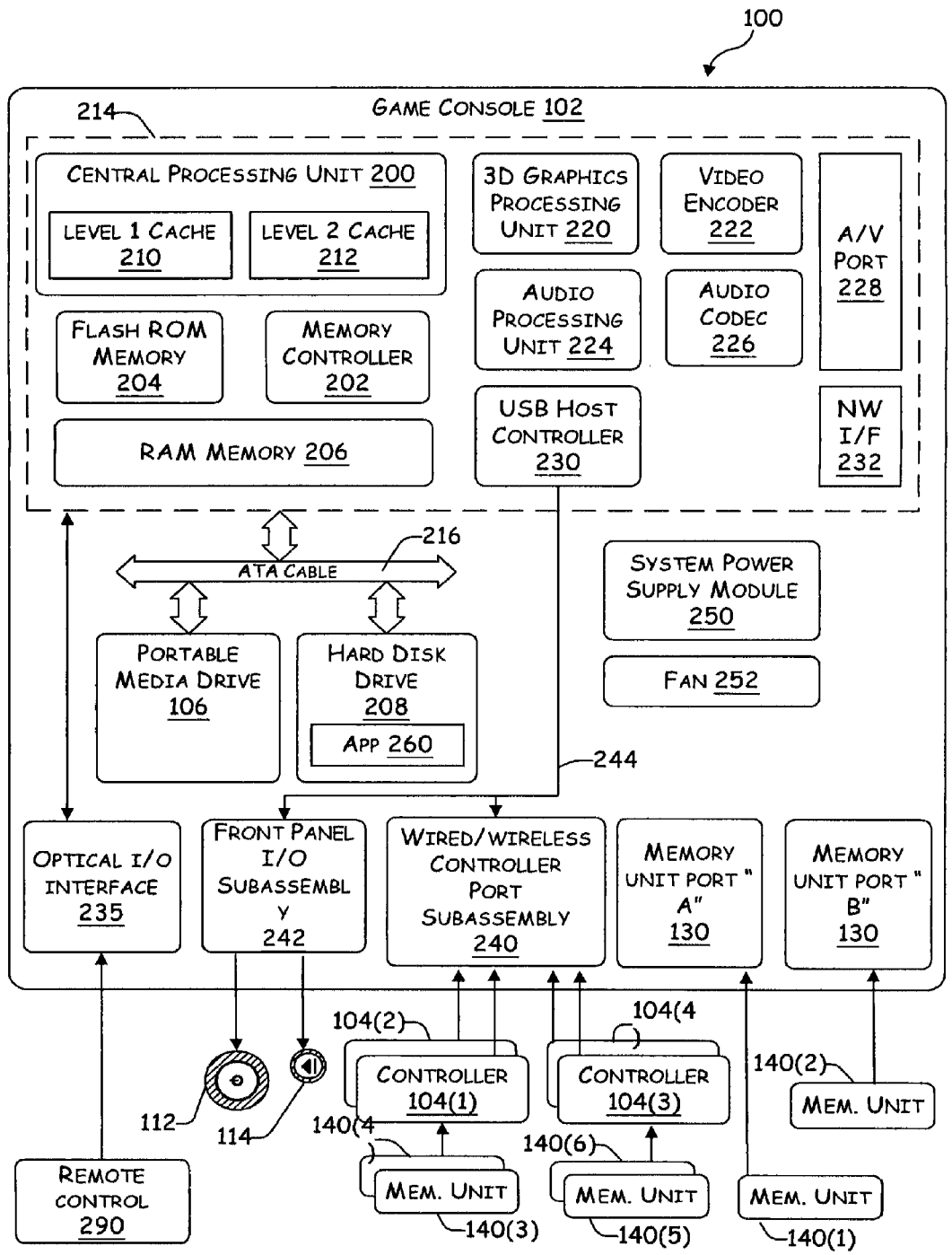
FIG. 2 is an exemplary functional block diagram of components of the gaming and media system shown in FIG. 1.

FIG. 2 is a functional block diagram of gaming and media system 100 and shows functional components of gaming and media system 100 in more detail. Console 102 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210, and a level 2 cache 212 to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a Peripheral Component Interconnect (PCI) bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller via the PCI bus and an AT Attachment (ATA) bus 216. However, in other implementations, dedicated data bus structures of different types can also be applied in the alternative.

A three-dimensional graphics processing unit (GPU) 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 2 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 2, console 102 includes a controller support subassembly 240 for supporting four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive Mus (not shown). Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202.

A system power supply module 250 provides power to the components of gaming system 100. A fan 252 cools the circuitry within console 102. An application 260 comprising machine instructions is stored on hard disk drive 208. When console 102 is powered on, various portions of application 260 are loaded into RAM 206, and/or caches 210 and 212, for execution on CPU 200, wherein application 260 is one such example. Various applications can be stored on hard disk drive 208 for execution on CPU 200.

Gaming and media system 100 may be operated as a standalone system by simply connecting the system to display 150 (FIG. 1), a television, a video projector, or other display device. In this standalone mode, gaming and media system 100 enables one or more players to play games, or enjoy digital media, e.g., by watching movies, or listening to music. However, with the integration of broadband connectivity made available through network interface 232, gaming and media system 100 may further be operated as a participant in a larger network gaming community.

Figure 3:
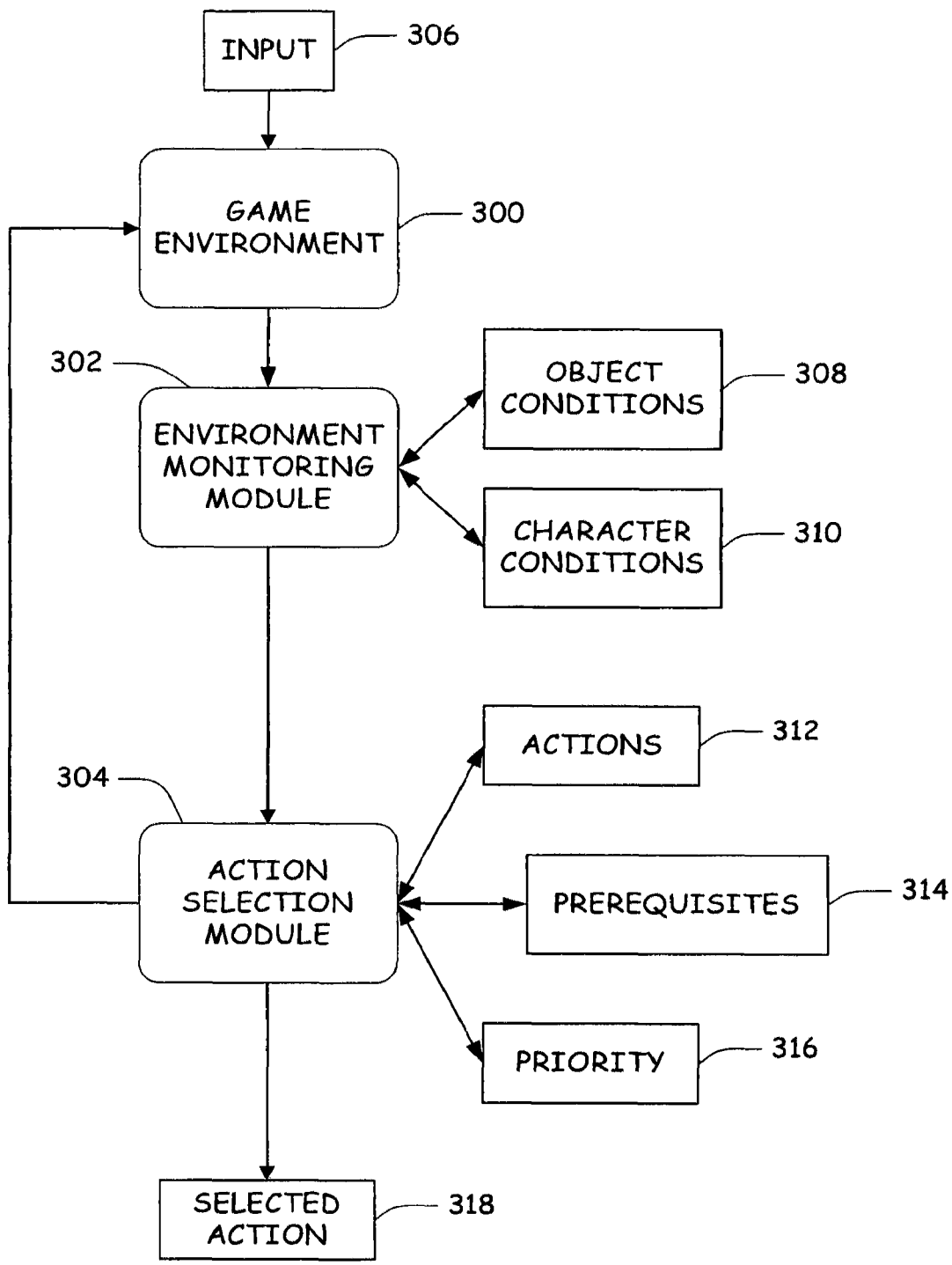
FIG. 3 is a block diagram of components for selecting actions in a game environment.

FIG. 3 is a block diagram of a game environment 300 that can be executed on a gaming system such as gaming system 100. Within game environment 300, a user operates a player character throughout a virtual world. The game environment 300 can display the player character as well as other characters (e.g., opponents, friends) and objects (e.g., moveable, stationary). The game environment 300 interacts with an environment monitoring module 302 and an action selection module 304 to select actions within the game environment 300 based on input 306 from a user.

The input 306 from the user can involve any particular operation of a game controller (e.g. controller 104) such as a simple "combat" button (e.g. one of buttons 136) being depressed and be accompanied by a directional movement of a joystick that is provided to game environment 300. The operation of the game controller can also involve triggers, joysticks, tilt sensing, position sensing, etc. as desired. Using the operation of the game controller, which in this case is a single combat button, a specified action can be selected to be performed within the game environment 300 based on a situational awareness of a player. The directional movement can also be utilized to determine a particular opponent to attack or a particular object to utilize when performing an attack. When input 306 is received, environment monitoring module 302 accesses object conditions 308 and character conditions 310 to determine a situational awareness for the player character. The situational awareness can be a status that changes as the player moves about the game environment 300. Given the current situational awareness status, an action can be selected that is entertaining to a user and independent of further inputs. Thus, the user does not need to provide complicated inputs to render an entertaining action. Each time the combat button is depressed, the situational awareness of the player is determined to select an action based on the determined situational awareness status.

Object conditions 308 relate to a position and state of objects within an environment. For example, the objects can include weapons, furniture, walls, cliffs, vehicles, and/or any other objects both movable and stationary within a game playing environment. If a player is holding a weapon, then the weapon can be used by the player for combat. The weapon also may be associated with a particular attack range. Additionally, if a piece of furniture is close to the player, the piece can be used in an action by the player to engage an opponent. Objects can also be thrown and/or kicked at opponents. Character conditions 310 refer to both the player character as well as other characters in the environment such as opponents and friends. The character conditions 310 also refer to a state for each of the characters within the game environment 300. For example, certain combat actions may only be available if an opponent is lying on the ground and/or stunned. Additionally, a player character may throw a right-handed punch or a left-handed punch depending on a stance for the player character. Environment monitoring module 302 passes the object conditions 308 and character conditions 310 to action selection module 304.

Action selection module 304 accesses a number of different actions 312, prerequisites 314 for each of the actions and a priority ranking 316 for each of the actions. Actions 312 can be a number of resulting actions for execution within game environment 300, including but not limited to, striking opponents, grappling opponents, parrying and counter attacking an opponent's attack, blocking, striking or grappling an opponent into or off of objects, throwing or kicking objects towards opponents, using objects as leverage for more elaborate or dramatic moves, punching, kicking, using a weapon, etc. The actions may also have variations, such as a left-handed and right-handed punch, jump kick and round house kick, etc.

Each of the actions 312 includes one or more prerequisites for its performance, which are noted in prerequisites 314. Action selection module 304 determines if actions 312 are valid based on the object conditions 308 and character conditions 310. If the object conditions 308 and character conditions 310 match prerequisites for one or more actions, these actions are noted as valid actions. The prerequisites correspond to object conditions and character conditions that are determined by environment monitoring module 302. For example, if an opponent is within close range (a character condition), a punch may be executed by the player upon receipt of an operation of a game controller. If the opponent is further away and out of close range, the opponent may only be within kicking range and thus a kicking action can be used upon receipt of the operation since the punching action prerequisite (where an opponent is in close range) is not met. Furthermore, if an opponent is within close range of an object, the player may use the object as a weapon for attacking the opponent. The prerequisites can also be utilized to produce combination attacks, wherein the input operation is provided in immediate intervals. Such combination attacks could involve a block followed by a punch, a punch followed by the player thrusting his knee into the opponent, a block followed by the player throwing the opponent into the wall and/or a punch/kick combination.

Priority ranking 316 can assign a priority to each of the actions 312 in a number of different ways. For example, the priority ranking 316 can be preset by a game developer of a gaming title or selected by a user. The priority ranking can include any number of unique values, such as 2 (i.e. low and high), 3 (i.e. low, medium and high) 5, 10 or any other number as desired. Valid actions, as determined by action selection module 304 given the situational awareness status, have their priority rank analyzed for selection in game environment 300. In one embodiment, more elaborate and dramatic actions receive a higher priority and will be selected over other actions which are not as dramatic. For example, if both a simple punch action and a furniture throwing action have met prerequisites based on the object conditions 308 and character conditions 310, the furniture throwing action can be selected if provided with a higher priority ranking than the punch action. In addition, the priority ranking for actions can be selected randomly or successively changed each time an action is used to provide a variety for selected actions. For example, the player could successively throw a left-handed punch followed by a right-handed punch. Based on the actions 312, prerequisites 314 and priority ranking 316, action selection module 304 outputs a selected action 318 to be performed within game environment 300.

Figure 4:
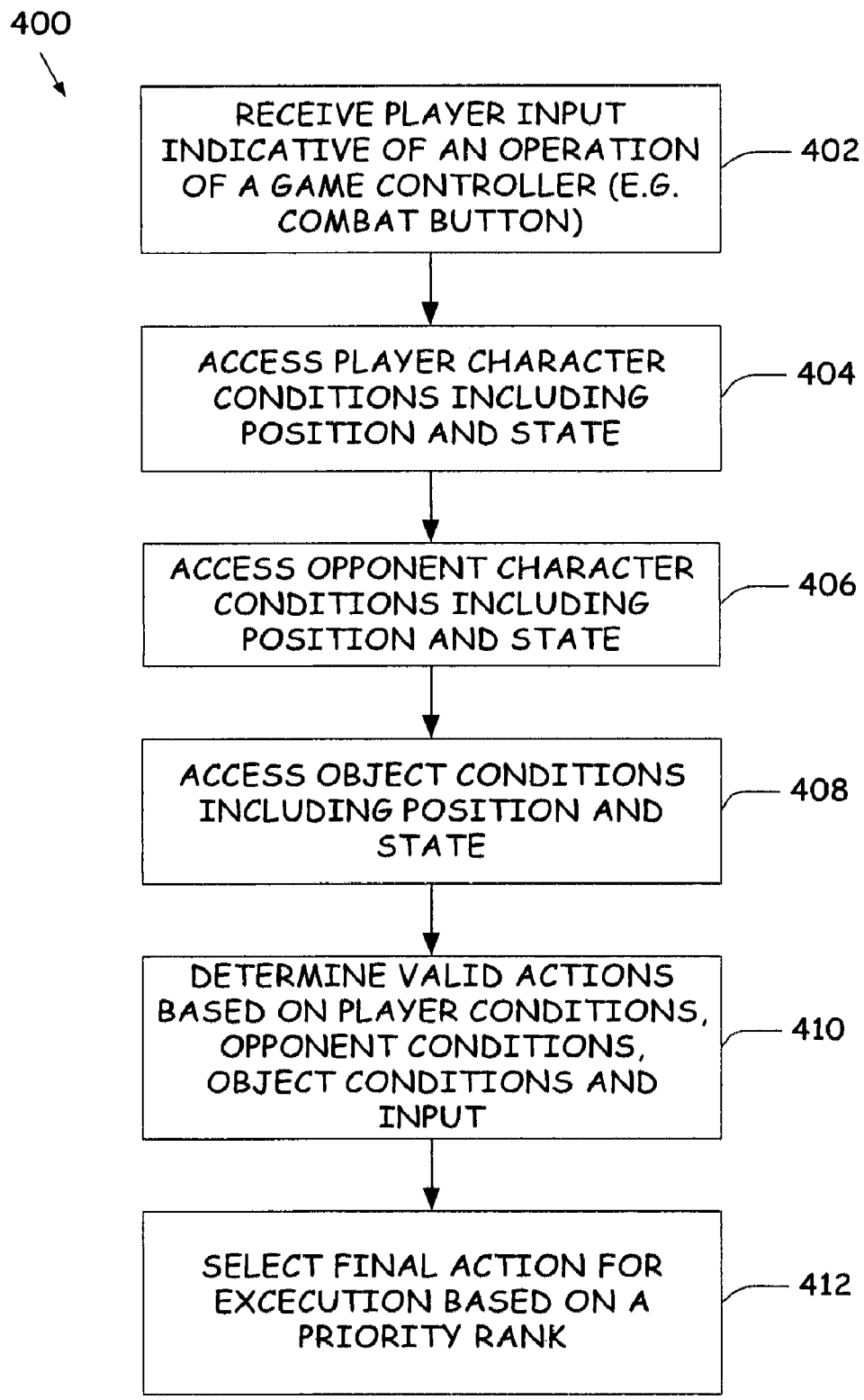
FIG. 4 is a flow diagram of a method for selecting an action.

FIG. 4 is a flow diagram of a method 400 for executing actions within a game environment. This method can be repeated several times as desired to select and execute an action (e.g. first action, second action, third action) given a player's situational awareness when a user provides an operation of a game controller such as depressing a combat button. The same operation can produce a different action based on the player's situational awareness. Method 400 begins at step 402, wherein player input indicative of the operation (i.e. the combat button) is received. Again, the combat button can be a single button so as to not require complicated inputs from a user. The combat button can also be accompanied by directional movement and/or other buttons. In one embodiment, selection of actions can be independent of any other input provided by the user. In yet a further embodiment, directional movement accompanying the combat button can be used as a guide for determining a particular opponent for which to attack.

At step 404, the player character conditions are accessed including a position and state for the player character. For example, the conditions can relate to where the player is in relation to other objects and characters, whether the player is holding a particular weapon, which direction the player is facing, etc. Next, at step 406, opponent character conditions are accessed including position and state of opponents. For example, an opponent can be within a particular zone, lying on the ground, stunned, attacking the player, etc. At step 408, object conditions including position and state for objects within a gaming environment are accessed. For example, these conditions can include the relation of objects to other character and/or objects, whether the object is stationary or moveable, a size of the object, an attack range if the object is a weapon, etc. Steps 404, 406 and 408 provide a situational awareness status for the player such that a suitable action can be selected.

Valid actions are then determined at 410 based on whether the determined conditions meet prerequisites of the actions. Valid actions can be placed in a list that is determined based on whether player conditions, opponent conditions and object conditions meet prerequisites for the actions. For example, if a particular object is not within range for an action, then a prerequisite for that action is not met. In step 412, a final action for execution in the game is selected based on a priority rank. For example, an opponent may be within a range where the player can punch the opponent or grab an opponent and throw the opponent off of an object. If the priority ranking for throwing the opponent off of the object is higher, that action is selected over the punch action. Method 400 can then be repeated for subsequent actions within the game environment based on the same operation provided by the user.

FIGS. 5-9 provide example environments for performing combat actions. By way of example only, the actions for performance in these environments include six actions, noted as punch, kick, use weapon to attack, smash opponent's face into object, throw opponent into object and kick opponent into object. More or less actions can be provided as desired, for example throwing an object, a counter attack, etc. Each of these actions can be performed by an operation of a game controller, such as pressing a single button, the same button being used for each action depending on a situational awareness for the player. Upon execution of the operation, the situational awareness is determined based on object and character conditions in the environment.

A table is provided below for the exemplary actions, their respective prerequisites and priority ranking. It will be appreciated that more or less actions, conditions and priority rankings can be utilized within environment 300. Within FIGS. 5-9, environment monitoring module 302 can be used to determine conditions and actions selection module 304 can use the table to select an action based on the conditions and a priority. FIGS. 5-9 also include zones of a player, which can be adjusted based on characteristics of players, opponents, other characters and/or objects. For example, if a player is holding a weapon, an attack zone for the player using the weapon can be larger than an attack zone for the player when not holding the weapon.

TABLE 1

A list of actions, prerequisites and priority ranking.

| Action No. | Action | Prerequisites (i.e. conditions) | Priority |
| --- | --- | --- | --- |
| 1 | Punch | Opponent in first zone of a player | Low |
| 2 | Kick | Opponent in second zone of a player | Low |
| 3 | Use Weapon | Player holding weapon and opponent in second zone of a player | High |
| 4 | Smash opponent's face into object | Opponent in first zone, object in first zone of a player and height of object is small | High |
| 5 | Throw opponent into object | Opponent in first zone, object in first zone of a player and height of object is large | High |
| 6 | Kick opponent into object | Opponent in second zone of a player and object in first or second zone | High |

Figure 5:
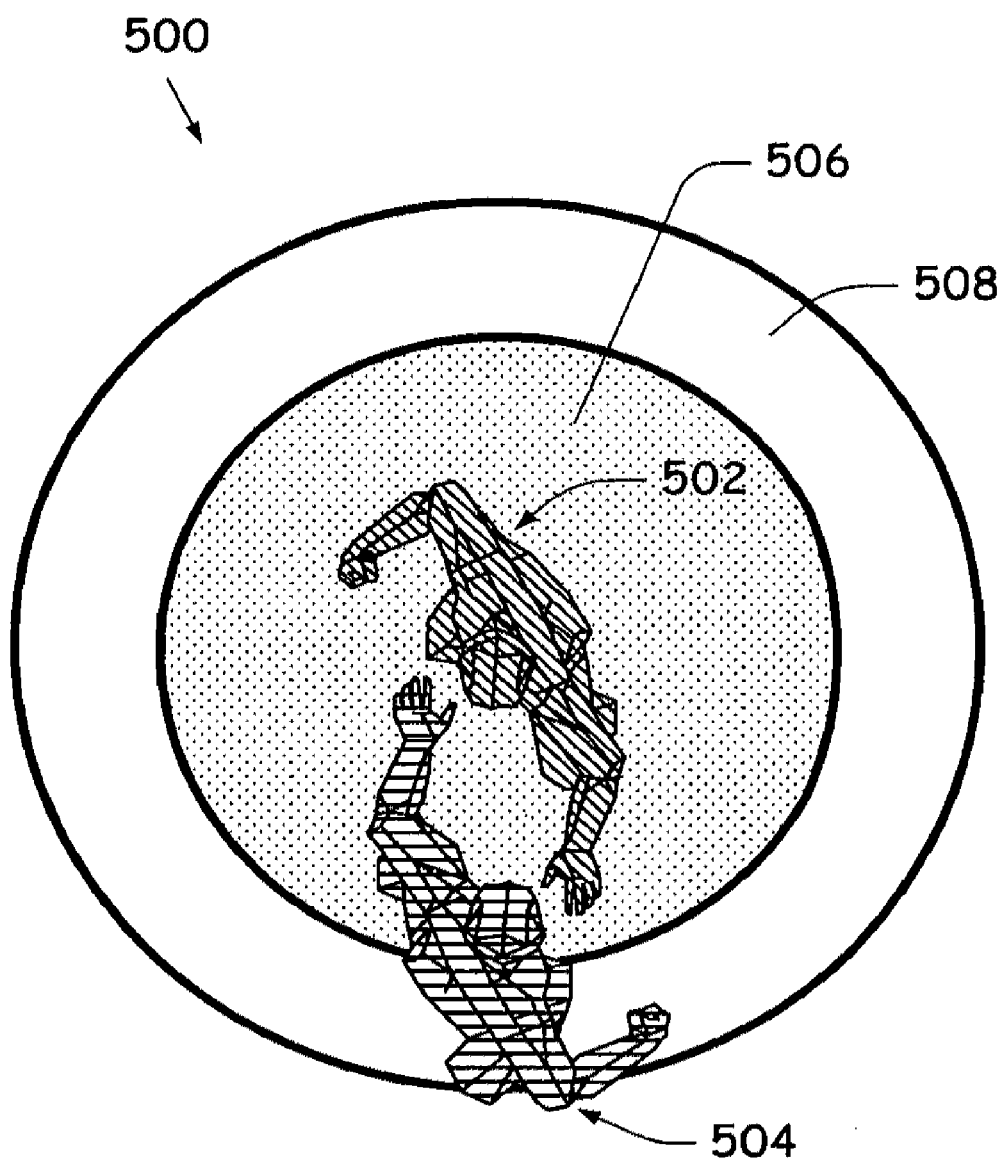
FIGS. 5-9 are illustrations of exemplary game environments.

FIG. 5 is a diagram of an environment 500 wherein a player 502 is engaging an opponent 504. Environment 500 includes a first zone 506 and a second zone 508 of the player 502. In this environment, a selected action is based on an attack range (i.e. a particular zone), which is measured by the player character 502 and its distance to the opponent 504. In environment 500, opponent 504 is within the first zone 506. In this case, the player is close enough to opponent 504 to perform the punch action (action 1) when a combat button is depressed. As a result, a punch is selected and performed within the environment. The other actions (2-6) are not selected since their prerequisites are not met. Actions 4 and 5 have one prerequisite that is met (that the opponent is in the first zone), but the other prerequisites are not met and thus do not form valid actions.

Figure 6:
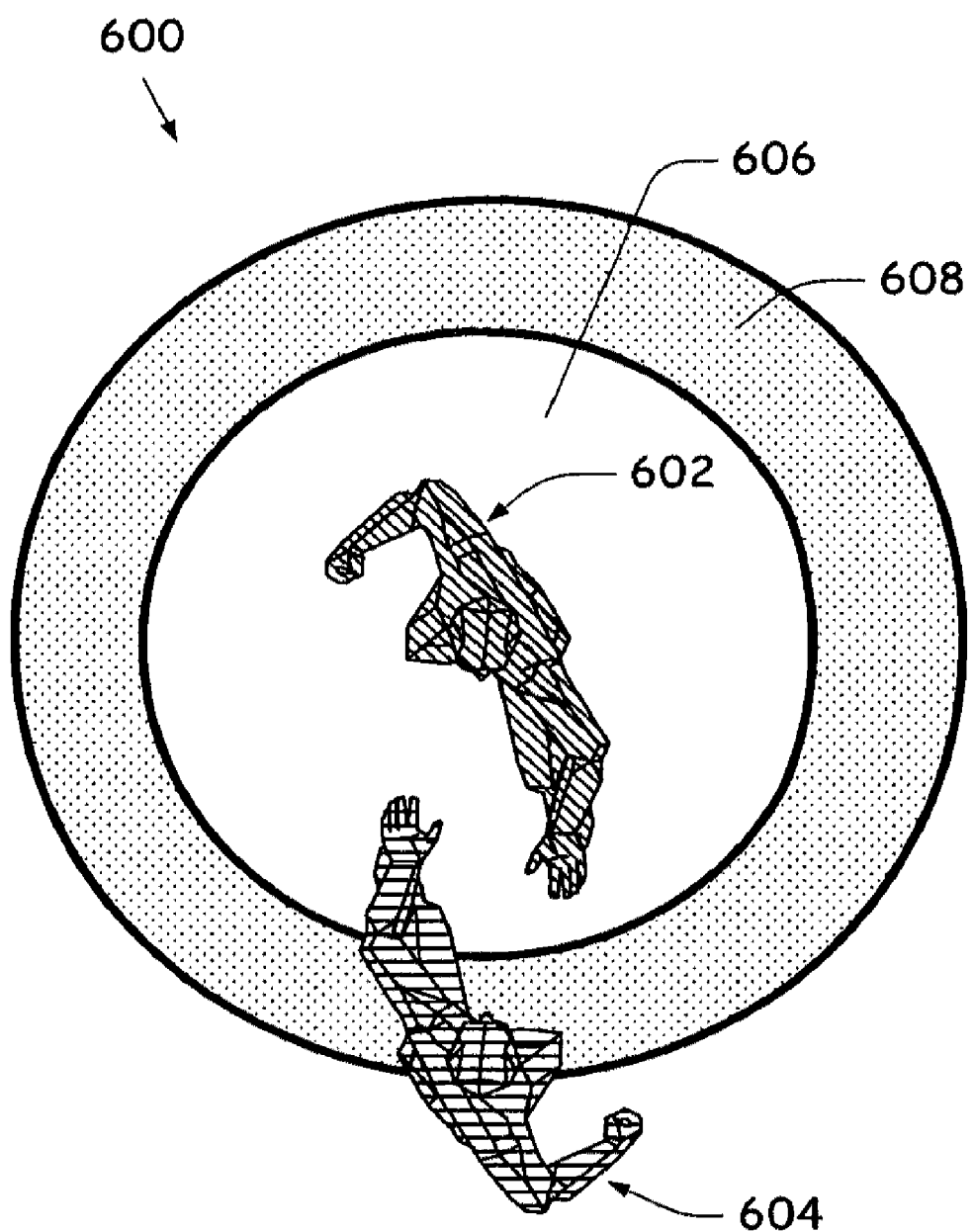

In FIG. 6, environment 600 is shown where a player 602 is further away from an opponent 604 than in environment 500. Environment 600 includes a first zone 606 and a second zone 608 of the player 602. In this situation, opponent 604 is within the second zone 608. When further away, opponent 602, upon pressing a combat button, will kick the opponent 604 rather than the punch that is performed in environment 500 since a prerequisite for the punch action (being within first zone 606) is not met. With reference to Table 1, actions 2, 3 and 6 all require that the opponent be within the second zone. However, since actions 3 and 6 have other prerequisites not met, action 2 is selected.

Figure 7:
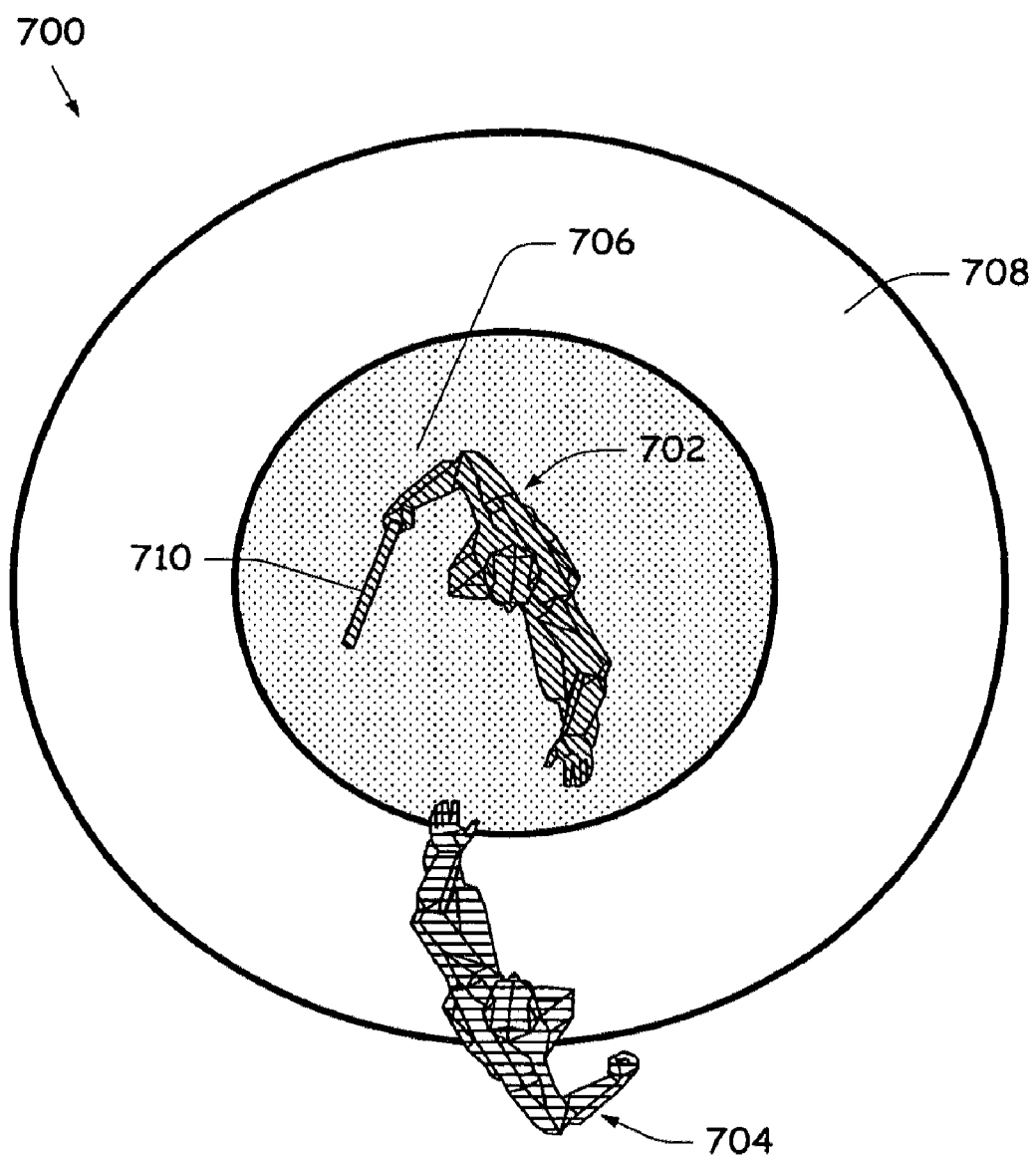

FIG. 7 is an environment 700 that illustrates the player 702 and an opponent 704. Environment 700 also includes a first zone 706 and a second zone 708 of the player 702. In this situation, player 702 is holding a weapon 710, which is an object condition. Both action 2 (kick) and action 3 (use weapon) have their prerequisites met and form a valid action list based on the object conditions and character conditions. However, action 3 has a high priority ranking, so that action is selected to be executed over the kick action, which has a low priority ranking. It is also worth noting that second zone 708 is larger than second zone 608 of FIG. 6 due to a range for weapon 710 that is larger than a kicking range.

Figure 8:
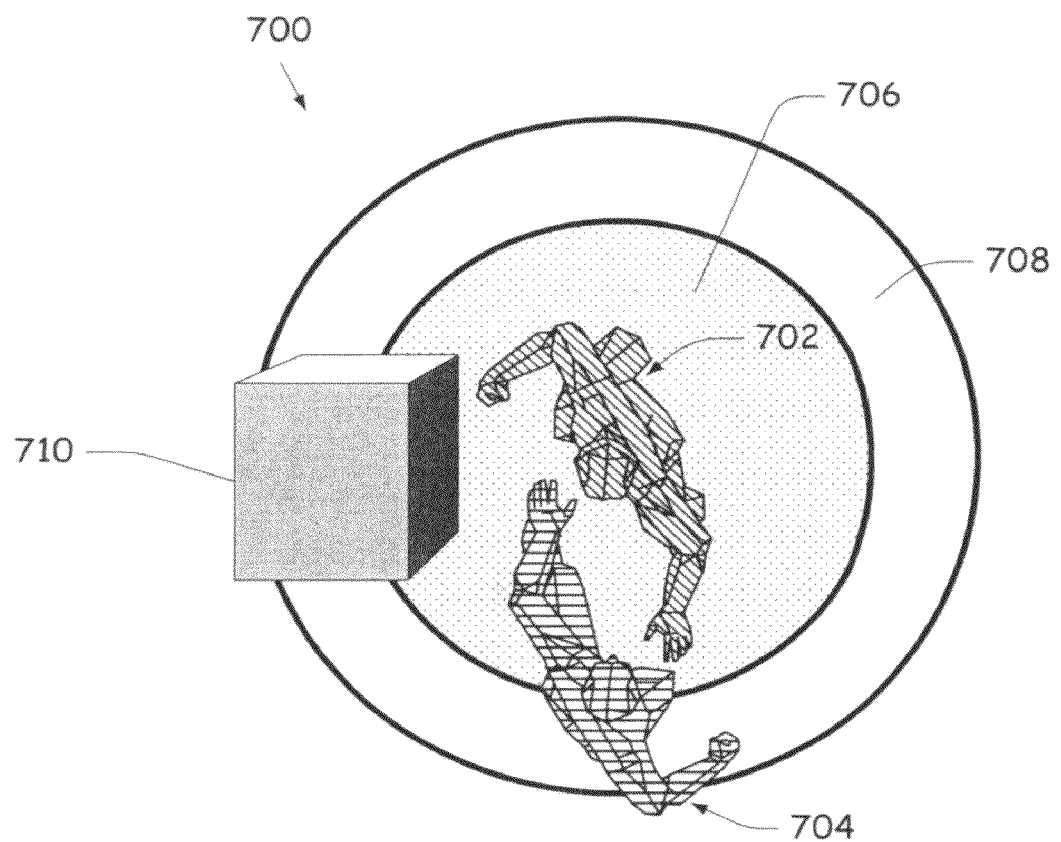

FIG. 8 illustrates an environment 800, where a player 802 is engaging an opponent 804. A first zone 806 and a second zone 808 are also provided within environment 800. In addition, an object 810 is also provided within first zone 806 of the player 802. The object conditions include 1) an object is in the first zone; and 2) the height of the object is small. The character conditions include an opponent in the first zone. Upon pressing the command button, rather than having player 802 merely punch opponent 804, the player 802 can use object 810 to provide a more dramatic move. Both action 1 and 4 have their prerequisites met. Action 4 is selected since its priority rank is high where the action 1 priority rank is low. Thus, upon the operation of the game controller by the user, player 802 will smash the opponent's face into object 810.

Figure 9:
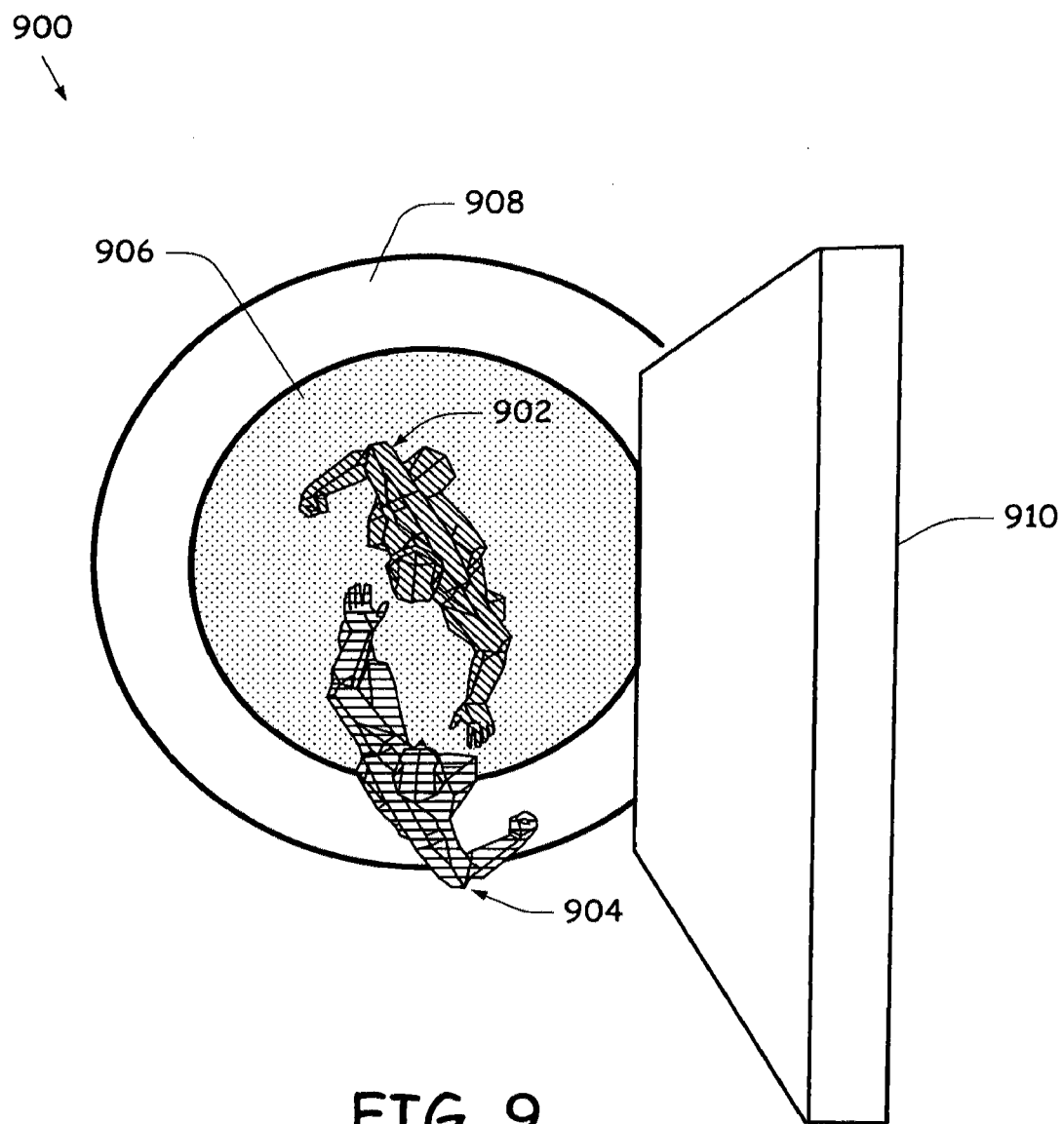

FIG. 9 is environment 900 including a player 902 and an opponent 904. Environment 900 includes a first zone 906 and a second zone 908 of the player 902. In addition, an object 910 is provided within first zone 906. Object 910 has a large height. Referring to Table 1, both actions 1 and 5 have their prerequisites met. However, action 5 has a higher priority rank and is selected for action. Thus, the player 902 can throw opponent 904 into object 910 upon actuation of a combat button from a user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of operating a game environment, comprising: receiving input from a user indicative of an operation of a game controller; assessing a situational awareness status of a user-controlled player including at least one player condition, at least one opponent condition and at least one object condition in the game environment, the at least one player condition including a plurality of attack zones that are centered about the user-controlled player, the at least one opponent condition including a position of the opponent relative to the plurality of attack zones, and the at least one object condition including a position of the object relative to the plurality of attack zones;
   identifying a plurality of possible actions for the player for execution in the game environment, each of the plurality of possible actions having one or more prerequisites that need to be fulfilled in order for the corresponding action to be performed, at least some of the one or more prerequisites being associated with the plurality of attack zones;
   utilizing a processor that is a component of a computing device to identify two or more of the plurality of possible actions for the player as having had their prerequisites fulfilled based on the operation of the game controller and the situational awareness;
   selecting one of the two or more of the plurality of possible actions for execution in the game environment, the selection of the one being based on priority rankings of the two or more of the plurality of possible actions;
   receiving a second input from the user indicative of the operation of the game controller after selecting the one of the two or more of the plurality of possible actions;
   assessing a second situational awareness status of the player that is different from the first-mentioned situational awareness status; and
   selecting a second action for the player that is different from the one of the two or more of the plurality of possible actions based on the second input and the second situational awareness status.

2. The method of claim 1 wherein the selection of the one is based on the one having a higher priority ranking than any other ones of the two or more of the plurality of possible actions, and wherein the plurality of attack zones include a first attack zone closest to user-controlled player and a second attack zone that is further away from the user-controlled player.

3. The method of claim 2 wherein the priority rankings are selected by the user, and wherein a size of the second attack zone is increased upon a weapon being associated with the user-controlled player.

4. The method of claim 1 wherein the priority rankings are selected by a developer of the game environment, and wherein the at least some of the one or more prerequisites that are associated with the plurality of attack zones include the opponent and the object being within a same one of the plurality of attack zones.

5. The method of claim 1 wherein the one of the two or more of the possible actions includes using a stationary object to attack an opponent in the game environment, and wherein the at least some of the one or more prerequisites that are associated with the plurality of attack zones include the opponent and the object being within different ones of the plurality of attack zones.

6. The method of claim 1 wherein the operation of the game controller includes pressing a button and a directional movement.

7. A computer readable storage medium having instructions that, when executed on a computer, cause the computer to operate an interactive interface with a user, the instructions comprising:
   a game environment adapted to receive input from a user indicative of an operation on a game controller and display content of a game including a user-controlled player, at least one object and at least one opponent;
   an environment monitoring module adapted to monitor current object conditions of the at least one object and current character conditions of the player and the at least one opponent within the game environment when the input is received;
   an action table having a plurality of separate entries, each of the plurality of separate entries corresponding to a different action that can be performed by the user-controlled player within the game environment, each entry including a description of the action, one or more prerequisites for performing the action, and a priority level of the action, the one or more prerequisites being based at least in part on the object conditions and the character conditions; and
   an action selection module that utilizes a processor that is a component of a computing device to select a first action for the player from the action table for the game environment based on a first situational awareness that includes the object conditions, the character conditions, the one or more prerequisites, and the priority levels, and the action selection module selecting a second action for the player from the action table for the game environment based on a second situational awareness and a second input from the user indicative of the operation On the game controller, the second situation awareness being different from the first situational awareness, and the second action being different from the first action.

8. The computer readable storage medium of claim 7 wherein the one or more prerequisites includes a location of the at least one opponent relative to a zone.

9. The computer readable storage medium of claim 8 wherein the one or more prerequisites includes a status of the user-controlled player relative to a weapon.

10. The computer readable storage medium of claim 7 wherein the different actions include the player attacking the at least one opponent, the player using a weapon, and the player attacking the at least one opponent with the at least one object.

11. The computer readable storage medium of claim 7 wherein the object conditions include a position of the at least one object and the character conditions include a position of the at least one opponent relative to one or more zones.

12. The computer readable storage medium of claim 7 wherein the game environment is adapted to receive a third input of the user indicative of the operation of the game controller after the action selection module has selected the first and the second actions, and wherein the action selection module selects a third action different from the first and the second actions based on current object conditions and current character conditions determined by the environment monitoring module when the third input is received.

13. The computer readable storage medium of claim 12 wherein the operation is a button being pressed on the game controller and a directional movement.

14. A method for performing combat actions in a game environment, comprising:
 identifying a player, an opponent, and an object in the game environment;
 receiving user input indicative of an attack by the player against the opponent; determining a position and a state of the player, a position and a state of the opponent, and a position of the object;
 providing a priority ranking to each one of a plurality of combat attack actions; and utilizing a processor that is a component of a computer to select a combat attack action performed by the player against the opponent from the plurality of combat attack actions based on the position and the state of the player, the position and the state of the opponent, the position of the object, and the priority rankings;
 receiving a second user input indicative of another attack by the player against the opponent; and
 selecting a second combat action that is different from the first combat action and that is performed by the player against the opponent, the second combat action being selected from the plurality of combat attack actions based on a second position and state of the player, a second position and state of the opponent, a second position of the object, and the priority rankings.

15. The method of claim 14 wherein the combat attack action includes the player using the object as a weapon to attack the opponent, wherein the priority rankings are set by a user, and wherein the state of the player includes a stance of the player.

16. The method of claim 14 wherein the combat attack action includes throwing the opponent against the object, wherein the priority rankings are set by a developer of the game environment, and wherein the state of the opponent includes the opponent lying on a ground and/or being stunned.

17. The method of claim 14 and further comprising:
 receiving user input indicative of initiating a third attack by the player, the user input being the same as initiating the first and the second attacks;
 selecting a third combat attack action performed by the player from the plurality of combat attack actions; and
 wherein the priority rankings include low, medium, and high.

18. The method of claim 17 wherein the user input includes a button being pressed and a directional movement.

19. The method of claim 14 wherein the combat attack action includes a combination of attacks.

\* \* \* \* \*